US011926453B2

(12) United States Patent
Boyd

(10) Patent No.: US 11,926,453 B2
(45) Date of Patent: Mar. 12, 2024

(54) CONTAINER

(71) Applicant: DAA IP Pty Ltd, Richmond (AU)

(72) Inventor: Garry Boyd, Sunbury (AU)

(73) Assignee: DAA IP Pty Ltd, Richmond (AU)

( * ) Notice: Subject to any disclaimer, the term of this patent is extended or adjusted under 35 U.S.C. 154(b) by 461 days.

(21) Appl. No.: 17/274,180

(22) PCT Filed: Sep. 6, 2019

(86) PCT No.: PCT/AU2019/005065
§ 371 (c)(1),
(2) Date: Mar. 7, 2021

(87) PCT Pub. No.: WO2020/047615
PCT Pub. Date: Mar. 12, 2020

(65) Prior Publication Data

US 2021/0198003 A1 Jul. 1, 2021

(30) Foreign Application Priority Data

Sep. 7, 2018 (AU) ................................ 2018903337

(51) Int. Cl.
*B65D 5/66* (2006.01)
*A61J 1/03* (2023.01)
*B31B 50/26* (2017.01)
*B65D 5/20* (2006.01)
*B31B 110/35* (2017.01)
(Continued)

(52) U.S. Cl.
CPC .............. *B65D 5/6673* (2013.01); *A61J 1/03* (2013.01); *B31B 50/26* (2017.08); *B65D 5/2057* (2013.01); *B31B 2110/35* (2017.08); *B31B 2120/102* (2017.08); *B31B 2120/302* (2017.08)

(58) Field of Classification Search
CPC .. B65D 5/6673; B65D 5/2057; B65D 75/326; B65D 5/3664; B31B 50/26; B31B 50/262
USPC ... 206/232, 39, 424, 528, 530, 540, 539, 38, 206/37; 229/103.3, 125.31, 75, 126, 128, 229/131, 116.5
See application file for complete search history.

(56) References Cited

U.S. PATENT DOCUMENTS 1,943,074 A 1/1934 Heyman
3,749,301 A * 7/1973 Peckar ................ B65D 5/6673 229/125.37

(Continued)

FOREIGN PATENT DOCUMENTS

EP 0818393 A1 1/1998
GB 2241470 A 9/1991

(Continued)

*Primary Examiner* — Rafael A Ortiz
(74) *Attorney, Agent, or Firm* — Patwrite Law; Mark David Torche

(57) ABSTRACT

A sealed container for the storage of a plurality of articles comprising an open topped receptacle having a lip that defines an opening through which the articles may pass into and from said receptacle and closure means, including a cover that is hingedly connected to the receptacle and which is sealably connected to the receptacle, for closing the opening. The receptacle also includes a flap that is hingedly connected to the cover and wherein the flap in one position is adapted to overly the cover and wherein information relating to the contents of the container is displayed on the cover and on the flap.

17 Claims, 3 Drawing Sheets

(51) Int. Cl.
*B31B 120/10* (2017.01)
*B31B 120/30* (2017.01)

(56) References Cited

U.S. PATENT DOCUMENTS

| | | | | | |
|---|---|---|---|---|---|
| 4,890,742 | A * | 1/1990 | Allison | B65D 50/045 206/811 |
| 5,078,268 | A * | 1/1992 | Olson | G11B 23/0233 229/122.34 |
| 5,740,938 | A * | 4/1998 | Hofmann | B65D 43/162 220/4.23 |
| 5,862,908 | A * | 1/1999 | Arbin | A61F 6/005 220/834 |
| 8,657,184 | B2 * | 2/2014 | Gao | B65D 5/241 229/122.34 |
| 9,708,094 | B2 * | 7/2017 | Shaw | B65D 5/22 |
| 2007/0194128 | A1 | 8/2007 | Coe | |
| 2010/0006632 | A1 * | 1/2010 | Conroy | B65D 5/248 229/184 |
| 2016/0159515 | A1 * | 6/2016 | Putko | B65D 5/0254 229/152 |
| 2016/0257443 | A1 | 9/2016 | Shaw | |

FOREIGN PATENT DOCUMENTS

| | | | | |
|---|---|---|---|---|
| WO | 2007007197 | A2 | 1/2007 | |
| WO | WO-2013056336 | A1 * | 4/2013 | B31F 1/10 |

* cited by examiner

CONTAINER

This invention relates to an improved container.

This invention has particular, but not exclusive, application to sealed containers that are used as dose administration aids, ("DAA"), and whereby reference will be made to same. However, it will be appreciated that this invention may also have application to containers for storing articles other than medications, such as toy building bricks, including toy building bricks that are sold as a kit and which may be specifically used for building one or more models.

It is important that persons who have been prescribed medications for managing or treating a medical condition take their medications on time and in the right doses. For people taking a large number of medications, or older people who may live alone or have limited access to a carer or support person, this can be a challenge.

Medication-related hospital admissions pose a significant problem in many communities, and are generally growing.

A dose administration aid, or DAA, is a well-sealed, tamper-evident device that allows individual medicine doses to be organised according to the prescribed dose schedule.

DAAs have been designed to assist consumers in the community to better manage their medicines, with the objective of avoiding medication misadventure and improving medication compliance.

DAAs facilitate the organisation of solid medications, such as tablets, pills and capsules, according to when they should be taken. They make it easy for persons who must take medications and their carers to ascertain the approximate time of day when medications must be taken, if the medications have indeed been taken and that the medications taken were of the prescribed dose.

One type of DAA, commonly referred to as a "blister pack", comprises a plurality of open-topped compartments arranged in rows representing the seven days of the week and in columns representing the time of the day that medications should be taken, such as "morning", "noon", "dinner" and "bedtime". The compartments are typically manufactured from a thin walled plastics material that can be easily deformed and whereby individual compartments are generally interconnected to adjacent compartments by a semi-flexible sheet, such as a sheet made from cardboard or a suitable plastics material.

The open-topped compartments, having been filled with one or more solid medications, are preferably sealed by a sheet of aluminium foil, or a similar material. Access to the solid medications may be achieved by peeling away the layer of aluminium foil and, for this purpose, the sheet of aluminium foil may include a tab which the user may grip and pull. Alternatively, the user may choose to puncture the layer of aluminium foil with say a pointed end of a knife, or by the application of a force applied to an exposed external side of the compartment sufficient to push one or more tablets against the underside of the aluminium foil such that an opening in the foil is formed.

The open-topped compartments are generally substantially circular in cross-section and come in a variety of sizes, including "small" 10 mm, "large" 15 mm, "jumbo" 22 mm and "extra jumbo" 27 mm diameter and whereby the number of tablets, pills and capsules that a compartment may hold is dependent upon the size of the tablets, pills and capsules to be stored therein.

Health regulations dictate that the contents of each compartment of a DAA be clearly displayed on each compartment, such as the portion of aluminium foil that forms a cover over the open top of the compartment. However it has been observed that the space available on the cover on which to record the contents of the compartment is limited and in some instances is too small on which to record details of all of the contents of the compartment.

It is therefore an object of the present invention to provide a sealed container that overcomes at least one of the deficiencies of the prior art and which will be reliable and efficient in use.

With the foregoing and other objects in view, this invention relates to a sealed container for the storage of a plurality of articles, such as a plurality of different solid medications, said sealed container including:

- an open topped receptacle for storing a plurality of articles, said receptacle having a lip that defines an opening through which the articles may pass into and from said receptacle;
- closure means, including a cover that is hingedly connected to said receptacle and which is sealably connected to said receptacle such that said cover closes said opening, and a flap that is hingedly connected to said cover, said cover having an internal face that faces the interior of said receptacle when said cover is used to close said opening and an opposing external face, said flap having a first face and an opposing second face, said flap being capable of movement between a first position wherein said flap at least partially overlies said cover and said first face faces said external face and a second position wherein said flap is connected to said cover but no longer overlies said cover, and whereby information concerning the contents of the receptacle is displayed on said external face and/or said first face and/or said second face.

Where the receptacle is used for the storage of medications, it is believed that by displaying details of the medications on both the external face of the cover and/or the first face of the flap and/or the second face of the flap, it will now be possible to store more medications in the receptacle than previously was the case.

Additional information concerning the medications, such as the dosage and/or the time during the day when the medications are to be taken, may also be printed on the external face and/or the first face and/or the second face.

Preferably information concerning the medications stored in the container is displayed on the external face of the cover and the first face of the flap and displayed in a manner that can be easily read and understood.

Further, it may be desirous that at least some of the information can be concealed from view and/or that there be provided means that will show that a person has accessed the information. For example, it may be undesirable that persons other than the intended user of the medications knows what medications are stored in the container. Accordingly, in one embodiment, such as when the medications are first supplied to the intended user, the flap may be retained in the first position by a sealable connection with the receptacle and/or the cover and whereby the sealable connection must be broken in order to read the information displayed on the external face of the cover and the first face of the flap, and wherein the broken connection will suggest that someone, possibly an unauthorised person, has read that information. For example, a suitable adhesive may be used to connect some peripheral edge portions of the flap to the cover. Alternatively, some peripheral edge portions of the flap may be connected to the cover by a perforated web or some other frangible connection.

The cover may be sealably connected to the receptacle in the vicinity of the lip, such as to a wall portion that surrounds the lip, or to the lip itself. For example, a suitable adhesive, such as a pressure sensitive adhesive or a heat sensitive adhesive, may be used to releasably and sealably secure the cover to the lip. However, in alternative embodiments, the peripheral edge portion of the cover may be adapted to mechanically engage with the lip. For example, the cover may include a peripheral channel that is adapted to embrace the lip or a peripheral flange that fits over the lip.

Preferably the flap is hingedly connected to the cover.

Preferably the receptacle includes either a plurality of side walls that extend upwardly from a base wall and wherein the base wall, or a portion of the base wall, may be transparent or sufficiently translucent such that it is possible to view the contents of the container through the base wall.

It is envisaged that the container will be used to store a plurality of medications to be taken at the same time and wherein a plurality of containers containing the medications a person is required to take over a prescribed period, such as a period of seven days, may be provided in a carton or cassette. Consequently, the container may include a tab for pulling the container from the confines of a carton or cassette. For example, the tab may be connected to and extend outwardly from a side wall of the receptacle or from the cover. Preferably the tab is connected to and extends outwardly from the flap.

The tab may also assist persons to break the sealable connection connecting separate portions of the flap to the cover and/or to break the sealable connection connecting the cover to the receptacle.

Preferably the container is reusable. That is to say, preferably the container is capable of being used to temporarily store items therein once the cover has initially been displaced so as to permit initial access to the contents of the container. For example, it may be possible to retain the cover in a closed, but not necessarily a sealed closed position, relative to the opening using retaining means.

The retaining means may incorporate the flap. For example, the flap may be adapted so that it can be wrapped around portions of the receptacle and retained in such a position by suitable fastening means.

In another aspect, this invention relates to a sealed container for the storage of a plurality of articles, such as different solid medications, said sealed container including:

- an open topped receptacle for storing a plurality of articles, said receptacle having a body in which there is formed a cavity and a lip that defines an opening in communication with said cavity through which the articles may pass into and from said receptacle;
- closure means, including a cover that is hingedly connected to said receptacle, said cover being moveable between a first operative position wherein said cover is sealably connected to said receptacle such that said cover sealably closes said opening and a second operative position wherein portions of said cover have been displaced relative to the receptacle so as to provide access to said opening, and between a second operative position and a third operative position where said cover again closes said opening, said cover having an internal face that faces the interior of said receptacle when said cover is used to close said opening and an opposing external face;
- retaining means for retaining said cover in its third operative position;
- a flap that is connected to said cover, said flap having a first face and an opposing second face, said flap being capable of movement between a first position wherein said flap at least partially overlies said cover and said first face faces said external face and a second position wherein said flap is connected to said cover but no longer overlies said cover, and whereby information concerning the medications is displayed on said external face and/or said first face and/or said second face.

Preferably the retaining means includes a tab that is connected to the cover, said tab being securable to said receptacle, such as a front wall of the receptacle.

Preferably the flap assists in maintaining the cover in its third operative position. For example, the flap may also be permitted to extend generally away from the cover and about the body of the receptacle, and wherein the flap may connect the cover to the tab. Further, the flap may be substantially flexible along its length. For example, the flap may resemble a strip or strap of flexible material.

Preferably, the receptacle includes opposing front and rear walls that are separated by and which extend upwardly from a base wall, and wherein the cover includes a first edge portion that is hingedly connected to the front wall, or adjacent the front wall, and an opposing second edge portion, and wherein the flap includes a first flap portion hingedly connected to the cover's second edge portion and a second flap portion hingedly connected to the first flap portion along opposing intermediate edge portions of the first and second flap portions, the first and second flap portions in combination being capable of overlying the external face of the cover, and wherein the tab includes a first tab portion that is connected to the second flap portion and a second tab portion hingedly connected to the first tab portion along opposing intermediate edge portions, whereby when the closure means is in its first operative position, the first and second flap portions overlie the cover and the tab extends generally outwardly away from the front wall of the receptacle, and whereby when the closure means is in its third operative position, the opening is closed by the cover and is retained in this position by the first and second flap portions that overlie the rear wall and base wall respectively and wherein the second portion of the tab is releasably secured to the front wall.

Further, when the cover is in its first operative position, the tab preferably extends outwardly away from the receptacle, and wherein the tab may be used as a pull tab to remove the container from a confined space, such as when stored in a cassette.

Where the receptacle is used for the storage of medications, it is believed that by displaying details of the medications on both the external face of the cover and/or the first face of the flap and/or the second face of the flap, it will now be possible to store more medications in the receptacle than previously was the case.

In still yet another aspect, this invention relates to a sealed container for the storage of a plurality of different solid medications, said sealed container including:

- an open topped receptacle for storing a plurality of solid medications, said receptacle having a lip that defines an opening through which the medications may pass into and from said receptacle;
- closure means, including a cover that is adapted to sealably close said opening, said cover having an internal face and an opposing external face, and
- a label that is connected to said cover and which is capable of movement between a first position wherein at least a portion of said label partially overlies said cover and a second position whereby said label no longer overlies said cover, and wherein information concerning the contents of said receptacle is displayed on said cover and said label.

In another aspect, this invention relates to a container including:

a receptacle having a base wall, a front wall and an opposing rear wall, and a lip that defines an opening through which articles may pass into and from said receptacle;

closure means having two operative configurations for maintaining said opening closed, said closure means including a cover having a first edge portion hingedly connected to said front wall portion of said receptacle, or to said receptacle adjacent said front wall, and an opposing second end portion, said cover being capable of movement between a closed position in which it closes said opening and an open position, said cover having an internal face that faces the interior of said receptacle when said cover is in its closed position and an external face, whereby in the first closed configuration said cover is sealably connected to said lip, or to selected portions of said receptacle surrounding said lip, and wherein in the second closed configuration said cover is retained in a closed position by a tab that is connected to said cover, said tab being releasably secured to said front wall of said receptacle.

Preferably the tab is connected to the cover by a flap having a first flap portion hingedly connected to the cover's second edge portion and a second flap portion that is hingedly connected to the first flap portion along opposing intermediate edge portions of the first and second flap portions, the first and second flap portions in combination being capable of overlying the external face of the cover, and whereby the tab includes a first tab portion that is connected to the second flap portion and a second tab portion that is hingedly connected to the first tab portion along opposing intermediate edge portions, and whereby when the closure means is in its first operative configuration, the opening is closed by the cover, the first and second flap portions overlie the cover and the tab extends generally outwardly away from the front wall of the receptacle, and whereby when the closure means is in its second operative position, the opening is closed by the cover and is retained in this position by the first and second flap portions that overlie the rear wall and the base wall respectively and wherein the second portion of the tab is releasably secured to the front wall of the receptacle.

Preferably when the closure means is in its first operative position, one or more portions of the cover are sealably connected to the lip or to the receptacle in the vicinity of the lip.

Where the container is used to store a plurality of articles and the container is stored on shelving, or on any other suitable storage system, and particularly in instances where the container is stored with a plurality of like containers, such as side by side and/or one on top of the other, the tab preferably extends outwardly away from the storage system and whereby, in use, the container may be extracted from its stored position by pulling on the tab.

The tab may also be used as a means of distinguishing the contents of the container from the contents of like containers that it is stored with by information or other indicia that is indicative of the contents of the container that is displayed on the tab. For example, where the contents of the container includes a plurality of building blocks, an picture of a structure that can be built using the building blocks may be displayed on the tab. However, it will be appreciated that a bar code or a QR code may also be displayed on the tab.

In order to minimise the distance by which the tab extends outwardly from the container, the second tab portion may be folded back on the first tab portion and may be releasably retained in this position by suitable retaining means, such as by a suitable adhesive or by hook and loop fasteners.

Further, in some embodiments, the container when stored and for display purposes, may be suspended from a hook or a generally horizontally orientated rod by the tab. For example, the tab may include an aperture and wherein the aperture may be formed in the first tab portion and/or the second tab portion, and wherein there are apertures formed in both said first and second tab portions, the apertures may be aligned with one another when the second tab portion is folded back upon the first tab portion.

Alternatively, the first tab portion and/or the second tab portion may include a hook like portion.

In still yet another aspect, this invention relates to a container including:

a receptacle having a base wall, a front wall and an opposing rear wall, and a lip that defines an opening through which articles may pass into and from said receptacle;

closure means for closing said opening, said closure means including a cover having a first edge portion hingedly connected to said front wall portion, or to said receptacle in the vicinity of said front wall portion, and an opposing second edge portion, said cover being capable of movement between a closed position in which it closes said opening and an open position, said cover having an internal face that faces the interior of said receptacle when said cover is in its closed position and an external face;

a flap having a first flap portion hingedly connected to said cover's second edge portion and a second flap portion hingedly connected to said first flap portion along opposing intermediate edge portions of said first and second flap portions, said first and second flap portions in combination being capable of overlying said external face of said cover, and a tab having a first tab portion that is connected to said second flap portion and a second tab portion hingedly connected to said first tab portion along opposing intermediate edge portions, whereby when said closure means is in its first operative configuration, said opening is closed by said cover, said first and second flap portions overlie said cover and said tab extends generally outwardly away from said front wall of said receptacle, and whereby when said closure means is in its second operative position, said opening is closed by said cover and is retained in this position by said first and second flap portions that overlie said rear wall and said base wall respectively and wherein said second portion of said tab is releasably secured to said front wall of said receptacle.

Preferably, when the closure means is in its first operative position, one or more portions of the cover are sealably connected to the lip or to the receptacle in the vicinity of the lip, such as by a suitable adhesive.

Preferably, when the closure means is in its first operative position, one or more edge portions of the flap are sealably secured to the cover, such as by a suitable adhesive.

Preferably the tab is hingedly connected to the second flap portion along opposing edge portions whereby the second tab portion may be folded back upon the first tab portion and the second tab portion may be releasably secured to the front wall of the receptacle when the closure means is in its first operative position.

Information, including instructions, images and machine readable codes, relating to the contents of the container may be displayed on the internal face of the cover and/or the external face of the cover and/or the first face of the flap and/or the second face of the flap.

Where the container is used to store a plurality of building blocks, instructions showing how to use those building blocks in order to build a preferred structure and/or images of a structure that can be built using the building blocks may be displayed on the internal face of the cover and/or the external face of the cover and/or the first face of the flap and/or the second face of the flap.

Other indicia or information may also be displayed on the cover and/or the tab. For example, machine readable code, such as a QR code, may be displayed on the internal face of the cover and wherein the code, when read by a suitable reading device, will direct the user to web pages containing instructions for building a structure using the building blocks and/or images of a structure that can be built using the building blocks.

In another aspect, this invention relates to a blank for the production of a container of the type previously described herein, said blank being composed of cardboard or like packaging material, said blank including:

a base wall of generally rectangular shape, said base wall having a front edge portion and an opposing rear edge portion, a first side edge portion located between said front and rear edge portions and an opposing second side edge portion that is also located between said front and rear edge portions;

a rear wall of generally rectangular shape that extends along and is hingedly connected to said rear edge portion;

a front wall of generally rectangular shape having a front wall first edge portion and an opposing front wall second edge portion, said front wall side edge portion extending along and being hingedly connected to said front edge portion, said front wall being substantially identical to said rear wall;

a first side wall of generally rectangular shape that extends along and is hingedly connected to said first side edge portion;

a second side wall of generally rectangular shape that extends along and is hingedly connected to said second side edge portion, said first side wall being substantially identical to said second side wall;

a cover of generally rectangular shape having a cover first edge portion and an opposing cover second edge portion, said cover first edge portion extending along and being hingedly connected to said front wall second edge portion, said cover being substantially identical to said base wall;

a flap, including a first flap portion and a second flap portion that is hingedly connected to said first flap portion, said first flap portion and said second flap portion in combination when lying substantially flat being generally of rectangular shape and substantially identical to said cover, said first flap portion being generally rectangular in shape and substantially identical to said rear wall, said first flap portion having a first flap first edge portion and an opposing first flap second edge portion, said first flap first edge portion extending along and being hingedly connected to said cover second edge portion, said second flap portion being generally rectangular in shape and having a second flap first edge portion that extends along and is hingedly connected to said first flap second edge portion, said second flap portion having a second flap free end portion that is spaced from said second flap first edge portion;

a tab having a first tab portion and a second tab portion that is hingedly connected to said first tab portion, said first tab portion having a first tab first end portion that is connected to and extends away from said second flap free end portion and a first tab first edge portion that is spaced from said first tab first end portion and wherein the distance separating second flap first edge portion and said first tab first edge portion is substantially the same as the distance separating said front edge portion from said rear edge portion, and said second tab portion having a second tab first edge portion that is hingedly connected to said first tab first edge portion.

In order that this invention may be more easily understood and put into practical effect, reference will now be made to the accompanying drawings:

FIG. 1 shows a sealed container 10 for the storage and supply of a plurality of different solid medications. FIGS. 2 to 4 show the same container 10 in various modes of operation.

Figure 1:
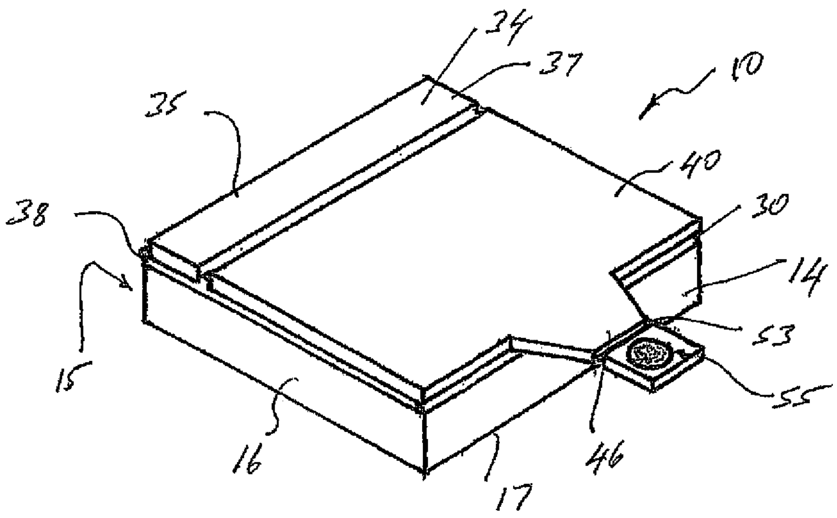
FIG. 1 is a pictorial view of a sealed container constructed in accordance with the present invention for the storage of a plurality of different solid medications, the container being shown in a closed and sealed state as it would normally be supplied to a person who has been prescribed medications for managing or treating a medical condition.

The sealed container 10 includes an open topped receptacle 11 of substantially square shaped cross-section and closure means 12 that is adapted to close the receptacle so as to inhibit access to the contents of the receptacle and/or to protect the contents of the receptacle against damage or loss.

The receptacle 11 is preferably manufactured from a suitable plastics material, such as a food grade plastics material, and is of a size that will fit comfortably in the palm of a person's hand. The receptacle 11 includes a front wall 14 and an opposing rear wall 15 that are maintained in a spaced relationship by opposing intermediate side walls 16. The front wall 14, rear wall 15 and two side walls 16 extend upwardly from a bottom wall 17 and in combination define a cavity 18.

Preferably the bottom wall is either transparent or sufficiently translucent that it is possible to identify the contents of the receptacle. Alternatively, the bottom wall 17 may include a transparent or translucent window.

In some embodiments the bottom wall 17, front wall 14, rear wall 15 and two side walls 16 may be formed integrally and wherein the bottom wall 17, front wall 14, rear wall 15 and two side walls 16 may be transparent or translucent. However, in other embodiments the bottom wall 17 may be constructed separately from the front wall 14, rear wall 15 and two side wall 16 and wherein the bottom wall 17 may be affixed to the front wall 14, rear wall 15 and two side wall 16 using a suitable process, such as a heat welding process.

Preferably the depth of the front wall 14, rear wall 15 and the side walls 16 is only slightly more than the thickness of the largest medication that might be stored in the container. This it is believed will reduce the likelihood that medications may be placed one on top of the other which will make it hard when inspecting the container to determine whether all of the required medications are present.

The free or upper edge portions 19 of the front wall 14, rear wall 15 and two side walls 16 in combination form a lip 20 that defines a substantially square shaped mouth or opening 21 through which the medications may pass. The lip 20 includes a substantially flat, upper facing, peripheral surface 22.

The closure means 12 includes a substantially square shaped movable cover or lidding 25 that is adapted to overlie the lip 20 and cover the opening 21 so as to prevent access to the contents stored in the cavity 18 of the receptacle 11. The cover 25 includes a substantially square shaped, flexible, semi-rigid panel 26 having a front edge portion 27, an opposing rear edge portion 28, and two opposing side edge portions 29. The front edge portion 27 of the cover 25 is hingedly connected to the upper edge portion 19*a* of the front wall 14 of the receptacle 11 by a hinge 30, such as a living hinge.

When the cover 25 is in a first operative position, as illustrated in FIG. 1, the front edge portion 27, rear edge portion 28, and two opposing side edge portions 29 are sealably connected to the surface 22 of the lip 21 by a suitable adhesive.

The closure means 12 also includes a flap 31 that is adapted to selectively overlie the cover 25 so as to cover the cover 25. The flap 31 includes a first or intermediate flap portion 32 and a second or distal flap portion 33. The first flap portion 32 includes a substantially rectangular, flexible, semi-rigid, panel 34 having opposing long side edge portions 35 and 36 and opposing short side edge portions 37. The long side edge portion 35 is hingedly connected to the rear edge portion 28 of the cover 25 by a hinge 38, such as a living hinge.

The second flap portion 33 includes a substantially rectangular, flexible, semi-rigid, panel 40 having an intermediate long side edge portion 41, an opposing free, long side edge portion 42, and two opposing short side edge portions 43. The intermediate long side edge portion 41 is hingedly connected to the long side edge portion 36 of the flap portion 32 by a hinge 44, such as a living hinge.

The second flap portion 32 also includes a flexible pull tab 45 that extends outwardly away from the free long side edge portion 42 and which includes a distal end portion 46.

The closure means 12 also includes a flexible locking tab 49 having a leading edge portion 50, an opposing trailing edge portion 51 and two opposing side edge portions 52. The trailing edge portion 51 is hingedly connected to the front edge portion 46 by a hinge 53, such as a living hinge.

The locking tab 49 also includes fastening means 55 for releasably securing the locking tab to the front wall 14 of the receptacle 11, such as a circular piece of fabric having either a plurality of either hook or loop like fastening elements. The fastening means 55 is adapted to releasably engage fastening means 56 consisting of opposing hook or loop fastening elements that are attached to a circular piece of fabric that is itself attached to the front wall 14.

When the flap 31 is in a first operative position, as illustrated in FIG. 1, the short side edge portions 37, the side edge portions 43 and the side edge portion 42 are sealably connected to the edge portions 27, 28 and 29 by a suitable adhesive.

It is proposed that the container 10 be used for the storage and supply of a plurality of different solid medications, such as perhaps twelve or more medications, including medications that are intended for a person to take at the same time, such as prescription medicines (MEDSdaa) (S4) and opioid/benzodiazepine medicines (PRNdaa) (S8) known as pro re nate or staged supply medicines.

The contents of the container 10 are preferably placed in the receptacle in an ordered manner, such as the largest tablets first, so that the contents of the container can be seen and readily identified during the filling process when viewed through the opening 21 and, when filled and the opening 21 has been sealably closed by the cover 25, through the transparent or translucent bottom wall 17.

The contents of the container are preferably recorded on one or more labels including a label 60 applied to the external surface 61 of the cover 25 and/or to a label 62 applied to the internal surface 63 of the second flap portion 32 and/or to a label 64 applied to an internal surface 65 of the distal flap portion 33.

It is envisaged that the medications will be provided to persons in the container 10 in its first operative state, as illustrated in FIG. 1. In this state the opening 21 is sealably closed by the cover 25 and the flap 31 both covers the cover 25 and is sealably connected thereto, and whereby the pull tab 46 extends generally outwardly and away from the front wall 14.

Figure 2:
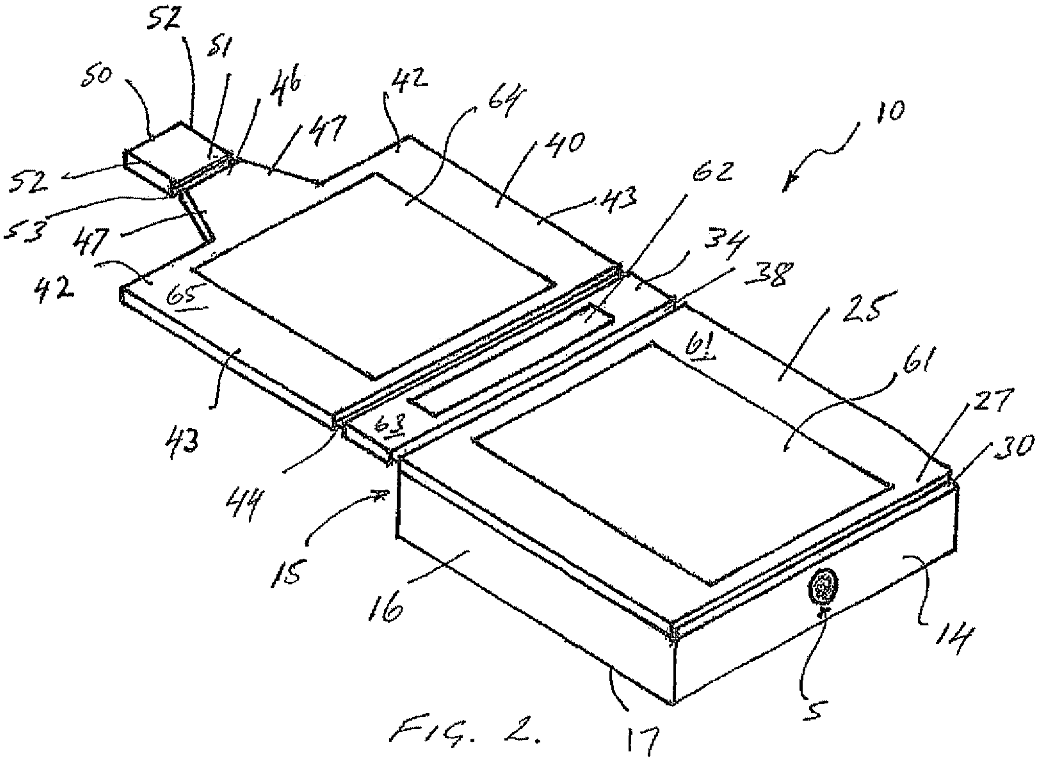
FIG. 2 is a pictorial view of the container shown in FIG. 1, the container being shown in a sealed state but wherein a flap on which is recorded information concerning the contents of the container is shown in its unfolded state.

In order for a person to gain access to the contents of the container 10 it is recommended that the person hold the container in the palm of their hand and between the thumb and one or more of their fingers, with the flap 31 uppermost. The person may in turn grip the pull tab 45 between the thumb and index finger of their other hand and then pull tab 45 generally upwardly and rearwardly, that is to say, in the general direction of the rear wall 15, so as to peel the distal flap portion 33 and then the intermediate flap portion 32 away from the cover 25, as generally indicated by arrow 70, and as illustrated in FIG. 2. In this state the labels 60 and/or 62 and/or 64 are first revealed and whereby the person may inform themselves of the medications stored in the container and any instructions or recommendations concerning the medications, such as how and/or when these medications should be taken that may also be recorded on the labels.

Figures 3, 4:
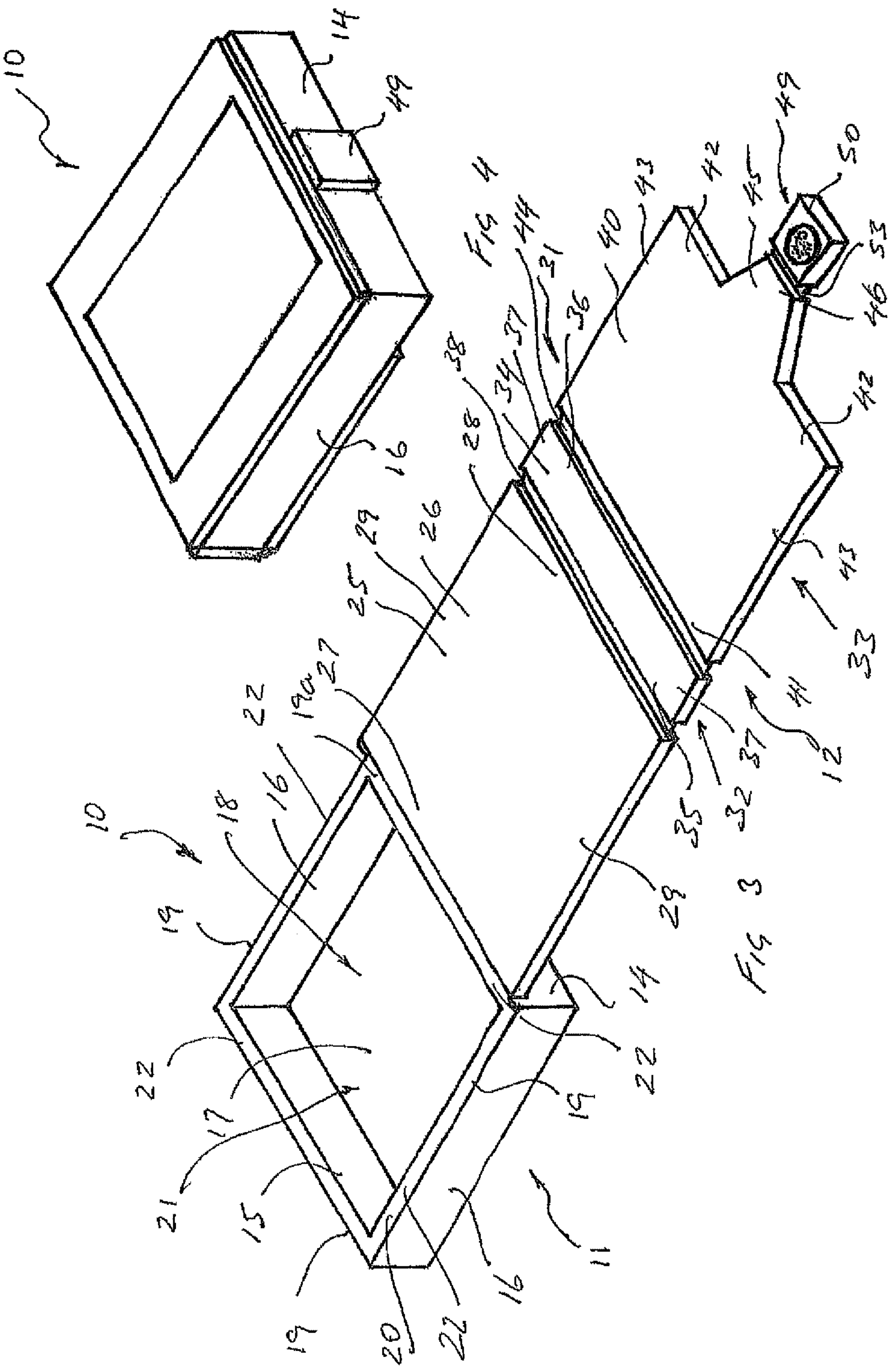
FIG. 3 is a pictorial view of the container shown in FIG. 1, the container being shown in its open state.
FIG. 4 is a pictorial view of the container shown in FIG. 1, the container being shown in a closed but unsealed state.

While still holding the container 10 in the palm of their hand, and between their thumb and fingers, and the pull tab 45 between the thumb and index finger of their other hand, the person may then pull the pull tab generally upwardly and in a forwardly, that is to say, in the general direction of the front wall 14, so as to peel the cover 25 away from the lip 20, as generally indicated by arrow 71, and as illustrated by FIG. 3.

The person may then invert the open receptacle 11 so that the contents may spill out into the palm of their other hand. Alternatively the person may prefer to pick out individual medications from the receptacle 11 using their fingers.

As stated above it is envisaged that the container 10 may be used for the storage and supply of a combination of medications including a quantity of medications that are to be taken at a prescribed time, say when the container is first opened, and other medications, namely staged supply medications, to be taken according to a prescribed dosing schedule, such as one tablet every four hours, at some of which the user may take at another time. However, it is envisaged that the container 10 may be used solely for the purpose of the supply of a quantity of medications to be taken at one particular time of day or a quantity of medications to be taken at various times according to a dosing schedule.

In those instances where the container 10 has been opened and it is desirous to continue to use the container to store staged supply medications, the cover 25 may again be placed over the opening 21 so as to cover the opening and thereby prevent inhibit access to the contents of the receptacle or the subsequent loss.

The cover 25 is retained in this operative position by firstly wrapping the flap 31 around the rear wall 15 and the bottom 17 and secondly, by folding the locking tab 49 over the front wall 14, the latter being retained in position by the engagement of the hook and loop fastening elements of fasteners 55 and 56, being the second operative state of the container 10, as illustrated in FIG. 4. In this operative state, the panel 34 overlies and abuts the rear wall 15, and the panel 40 and pull tab 45 overlie the bottom wall 17.

In order to open the container 10 when it is in the second operative state a person may hold the container in the palm of their hand and between their thumb and fingers, with the panel 40 facing upwards, and the locking tab 49 between the thumb and index finger of their other hand. Having then pulled the locking tab 49 both upwards and in the general direction of the rear wall 15, the person may then carefully invert the receptacle 11 prior to moving the cover from its operative position to a position whereby it is possible to access the contents of the receptacle via the opening 21.

It is envisaged that a plurality of containers 10, each filled with medications, will be supplied to a person in a carton or cassette. For example, the carton or cassette may container all of the medications a person must take during a prescribed period, such as a period of seven days. Further, if the contents of the containers varies depending on say the time of day that the medications must be taken, the containers may be arranged in a carton or cassette in a particular order, such as the order in which the medications are to be taken each day of the prescribed period.

It is envisaged that the container 10 may be made of cardboard or any other suitable packaging material.

Figure 5:
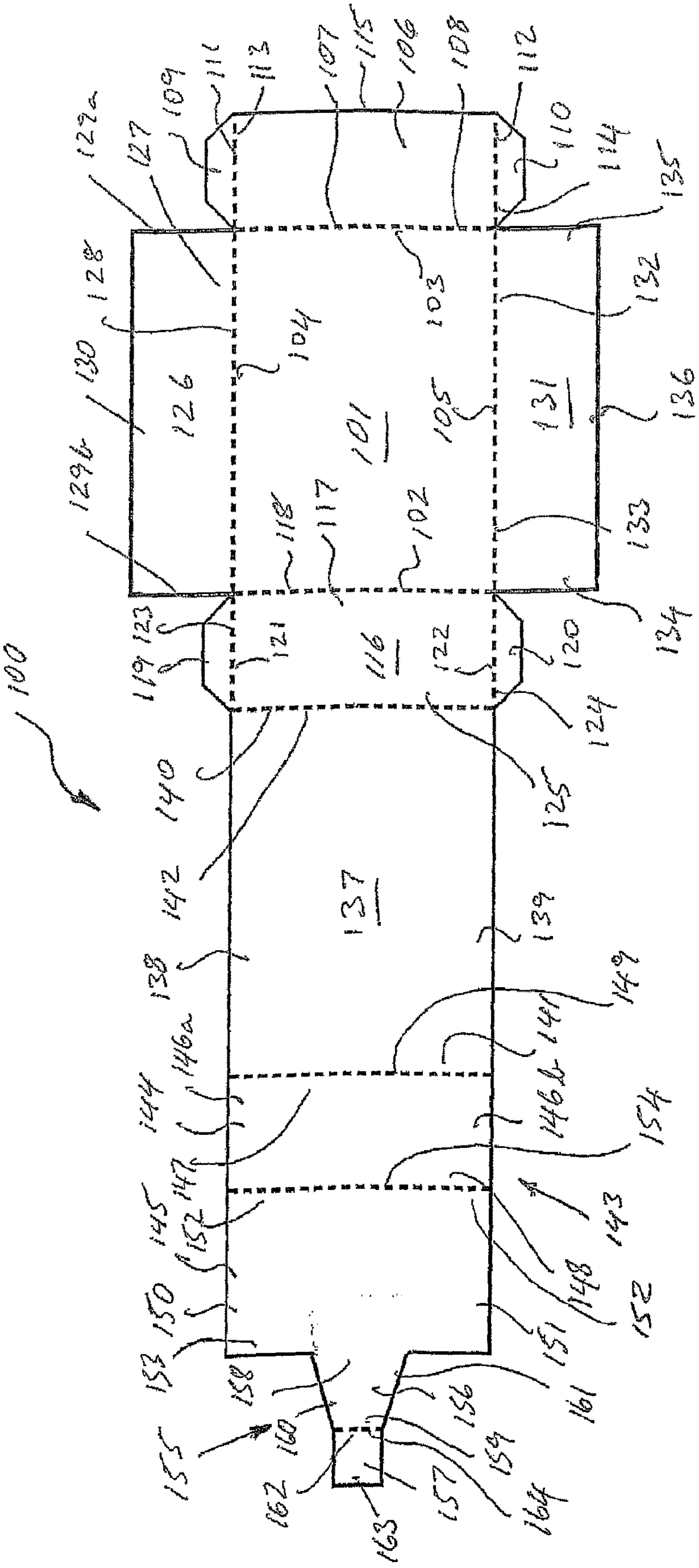
FIG. 5 is a plan view of a cardboard blank for constructing the container of the type shown in FIGS. 1 to 4.

FIG. 5 shows a blank 100 for the production of a container of the type illustrated in FIGS. 1 to 4, the blank being composed of cardboard or like packaging material.

The blank 100 includes a base wall 101 of generally rectangular shape and wherein the base wall 101 includes a front edge portion 102 and an opposing rear edge portion 103, a first side edge portion 104, located between said front and rear edge portions, and an opposing second side edge portion 105 that is also located between said front and rear edge portions.

The blank also includes a rear wall 106 of generally rectangular shape. The rear wall 106 includes a first elongate side edge portion 107 which is hingedly connected to the rear edge portion 103 along fold line 108.

The rear wall also includes two opposing flaps 109 and 110 that are each hingedly connected to a respective short side edge portion 111 and 112 of the rear wall 106 along respective fold lines 113 and 114.

The rear wall 106 also includes a free or second elongate side edge portion 115.

The blank also includes a front wall 116 of generally rectangular shape. The front wall 116 includes a first elongate side edge portion 117 which is hingedly connected to the front edge portion 102 along fold line 118.

The front wall 116 also includes two opposing flaps 119 and 120 that are each hingedly connected to a respective short side edge portion 121 and 122 of the front wall 116 along respective fold lines 123 and 124.

The front wall 116 also includes a second elongate side edge portion 125.

The blank also includes a first side wall 126 of generally rectangular shape. The side wall 126 includes a first elongate side edge portion 127 that is hingedly connected to the side edge portion 104 along fold line 128.

The side wall 126 also includes two opposing short side edge portions 129*a* and 129*b* located between the first elongate side edge portion 127 and an opposing free or second side edge portion 130.

The blank also includes a second side wall 131 of generally rectangular shape. The side wall 131 includes a first elongate side edge portion 132 that is hingedly connected to the side edge portion 105 along fold line 133.

The side wall 131 also includes two opposing short side edge portions 134 and 135 located between the first elongate side edge portion 132 and an opposing free or second side edge portion 136.

The blank also includes a cover 137 of generally rectangular shape. The cover 137 includes a first free or elongate side edge portion 138 and an opposing second free or elongate side edge portion 139. The cover further includes a first short side edge portion 140 and an opposing second short side edge portion 141, both of which are positioned between the two elongate side edge portions 138 and 139.

The first short side edge portion 140 in hingedly connected to the second elongate side edge portion 125 along fold line 142.

The blank also includes a flap 143, including a first flap portion 144 and a second flap portion 145.

The first flap portion 144 is generally rectangular in shape and includes a first free or short side edge portion 146*a* and a second or free side edge portion 146*b*. The two side edge portions 146*a* and 146*b* are located between a first elongate side edge portion 147 and an opposing second elongate side edge portion 148.

The first elongate side edge portion 147 is hingedly connected to the second short side edge portion 141 of the cover 137 along fold line 149.

The second flap portion 145 is generally rectangular in shape and includes a first free side edge portion 150 and a second free side edge portion 151. The two side edge portions 150 and 151 are located between a first elongate side edge portion 152 and an opposing second elongate side edge portion 153.

The first elongate side edge portion 152 is hingedly connected to the second elongate side edge portion 148 of the first flap portion 144 along fold line 154.

The blank also includes a tab 155, including a first tab portion 156 and a second tab portion 157.

The first tab portion 156 is generally trapezoidal in shape and includes a first elongate side edge portion 158 and an opposing shorter side edge portion 159. Located between the two side portions 158 and 159 are two divergent side edge portions 160 and 161 respectively.

The elongate side edge portion 158 is connected to and extends generally outwardly away from the second elongate side edge portion 153*a* of the second flap portion.

The second tab portion 157 is generally square in shape and includes a first side edge portion 162 and an opposing free or second side edge portion 163. The side edge portion 162 is hingedly connected to the short side edge portion 159 along fold line 164.

The container is constructed by folding the front wall 116, rear wall 106, and side walls 126 and 131 relative to the base wall 101 such that they extend generally upwards from the base wall 101. The walls in turn are retained in their upright position by securing flap 109 to edge portion 129*a*, flap 110 to edge portion 135, flap 119 to edge portion 129*b* and flap 120 to edge portion 134.

The base wall 101 and the upstanding walls 106, 131, 116 and 126 define a receptacle and wherein edge portions 115, 136, 125 and 130 combine to make a lip, which defines an opening that shall provide a user with access to articles stored within the confines of the receptacle.

The cover 137 may be folded along fold line 142 such that edge portions 138, 139 and 149 rest on edge portions 130, of the cover may be sealably connected to the edge portions of the receptacle using a suitable adhesive after the receptacle has been filled with articles.

The flap may be folded along fold line 149 such that it overlies the cover 137 and wherein edge portions 146*a* and 145 may be sealable secured to edge portion 138 using a suitable adhesive. Similarly, edge portions 146*b* and 151 may be sealably connected to edge portion 139 using a suitable adhesive. Similarly, edge portion 153 may be sealably connected to edge portion 140 using a suitable adhesive.

In this configuration, the tab extends generally outwardly from the front wall of the receptacle and whereby, in use, a user may pull on the tab to break the adhesive bonds connecting the flap to the cover and to break the adhesive bonds connecting the cover to the lip.

The second tab portion can be folded back upon the first tab portion by folding the tab along fold line 164. While the foregoing description has been given by way of example of the invention, it will be understood that the invention may be embodied in many other forms and all such forms are deemed to fall within the broad scope and ambit of the invention as hereinbefore described.

The claims defining the invention are as follows:

1. A sealed container for the storage of a plurality of articles, such as a plurality of different solid medications, said sealed container including:

an open topped receptacle having a lip that defines an opening through which the articles may pass into and from said receptacle;

closure means, including a cover having a first edge portion that is hingedly connected to said receptacle and wherein said cover is sealably connected to said receptacle such that said cover closes said opening, said cover being capable of movement about said hinged connection between said closed position and an open position wherein said opening is exposed, said cover including an internal face on one side thereof that faces the interior of said receptacle through said opening and an external face on an opposing side of said cover, and a flap having a first portion that is hingedly connected to a second edge portion of said cover, said flap having a first face and an opposing second face, said flap being initially temporarily retained in a first operative position whereby said first face at least partially overlies a portion of said cover that is covering said opening such that said first face at least partially overlies said external face said flap being capable of subsequent movement between said first operative position and a second operative position in which said first face and said external face are now visible about said hinged connection connecting said flap to said cover, and wherein after initially opening said receptacle, to temporarily close said receptacle said cover is returned to its closed position and retained in this position by wrapping said flap around portions of said receptacle other than said cover and retaining said flap in this said flaps third operative position by releasable retaining means.

2. The container as in claim 1, wherein information concerning the contents of said receptacle is displayed on said external face and said first face.

3. The container as in claim 1, wherein said flap is retained in said first position by a sealable connection with said receptacle and/or said cover.

4. The container as in claim 1, wherein said retaining means includes a tab that is connected to and which extends outwardly from a second end portion of said flap and whereby said tab extends outwardly from a side wall of said receptacle when said cover is in the closed position and said flap is in its first operative position.

5. The container as in claim 4, wherein said retaining means also includes means for releasably attaching said tab to said receptacle.

6. The container as in claim 5, wherein said receptacle includes a front wall and an opposing rear wall, said front wall being connected to said rear wall by a side wall that is opposite said opening, and wherein said first edge portion of said cover is hingedly connected to said front wall.

7. The container as in claim 6, wherein said tab extends outwardly away from said front wall when said flap is in said first operative position.

8. The container as in claim 6, wherein said flap is retained in said third operative position by attaching said tab to said front wall.

9. The container as in claim 6, wherein said flap includes a first portion that is adapted to overly said rear wall and a second portion that is adapted to at least partially overly side wall when said flap is in said third position.

10. The container as in claim 9, wherein said first portion of said flap is hingedly connected to said second portion of said flap.

11. The container as in claim 9, wherein said tab includes a first portion and a second portion, and wherein said first portion is hingedly connected to said second portion, and said first portion being connected to said second portion of said flap and adapted to partially overly said side wall.

12. The container as in claim 6, wherein said side wall is transparent or translucent.

13. A carton or cassette in which there is stored multiple containers of the type defined in claim 1, said carton or cassette having an opening through which one container at a time may be removed from said carton or cassette using said tab.

14. A container including:

a receptacle having a base wall, a front wall and an opposing rear wall, and a lip that defines an opening through which articles may pass into and from said receptacle;

closure means having two operative configurations for maintaining said opening closed, said closure means including a cover having a first edge portion hingedly connected to said front wall portion of said receptacle, or to said receptacle adjacent said front wall, and an opposing second end portion, said cover being capable of movement between a closed position in which it closes said opening and an open position, said cover having an internal face that faces the interior of said receptacle when said cover is in its closed position and an external face, whereby in the first closed configuration said cover is sealably connected to said lip, or to selected portions of said receptacle surrounding said lip, and wherein in the second closed configuration said cover is retained in a closed position by a tab that is connected to said cover, said tab being releasably secured to said front wall of said receptacle.

15. The container as in claim 14, wherein said tab is connected to said cover by a flap having a first flap portion hingedly connected to said cover's second edge portion and a second flap portion that is hingedly connected to said first flap portion along opposing intermediate edge portions of said first and second flap portions, said first and second flap portions in combination being capable of overlying said external face of said cover, and whereby said tab includes a first tab portion that is connected to said second flap portion and a second tab portion that is hingedly connected to said first tab portion along opposing intermediate edge portions, and whereby when said closure means is in its first operative configuration, said opening is closed by said cover, said first and second flap portions overlie said cover and said tab extends generally outwardly away from said front wall of said receptacle, and whereby when said closure means is in its second operative position, said opening is closed by said cover and is retained in this position by said first and second flap portions that overlie said rear wall and said base wall respectively and wherein said second portion of said tab is releasably secured to said front wall of said receptacle.

16. The container as in claim 15, wherein information relating to the contents of said container is displayed on said tab.

17. A container including:

a receptacle having a base wall, a front wall and an opposing rear wall, and a lip that defines an opening through which articles may pass into and from said receptacle;

closure means for closing said opening, said closure means including a cover having a first edge portion hingedly connected to said front wall portion, or to said receptacle in the vicinity of said front wall portion, and an opposing second edge portion, said cover being capable of movement between a closed position in which it closes said opening and an open position, said cover having an internal face that faces the interior of said receptacle when said cover is in its closed position and an external face;

a flap having a first flap portion hingedly connected to said cover's second edge portion and a second flap portion hingedly connected to said first flap portion along opposing intermediate edge portions of said first and second flap portions, said first and second flap portions in combination being capable of overlying said external face of said cover, and a tab having a first tab portion that is connected to said second flap portion and a second tab portion hingedly connected to said first tab portion along opposing intermediate edge portions, whereby when said closure means is in its first operative configuration, said opening is closed by said cover, said first and second flap portions overlie said cover and said tab extends generally outwardly away from said front wall of said receptacle, and whereby when said closure means is in its second operative position, said opening is closed by said cover and is retained in this position by said first and second flap portions that overlie said rear wall and said base wall respectively and wherein said second portion of said tab is releasably secured to said front wall of said receptacle.

* * * * *